UNITED STATES PATENT OFFICE.

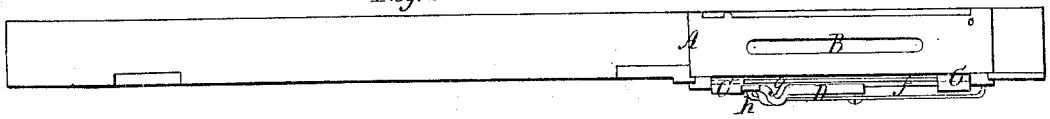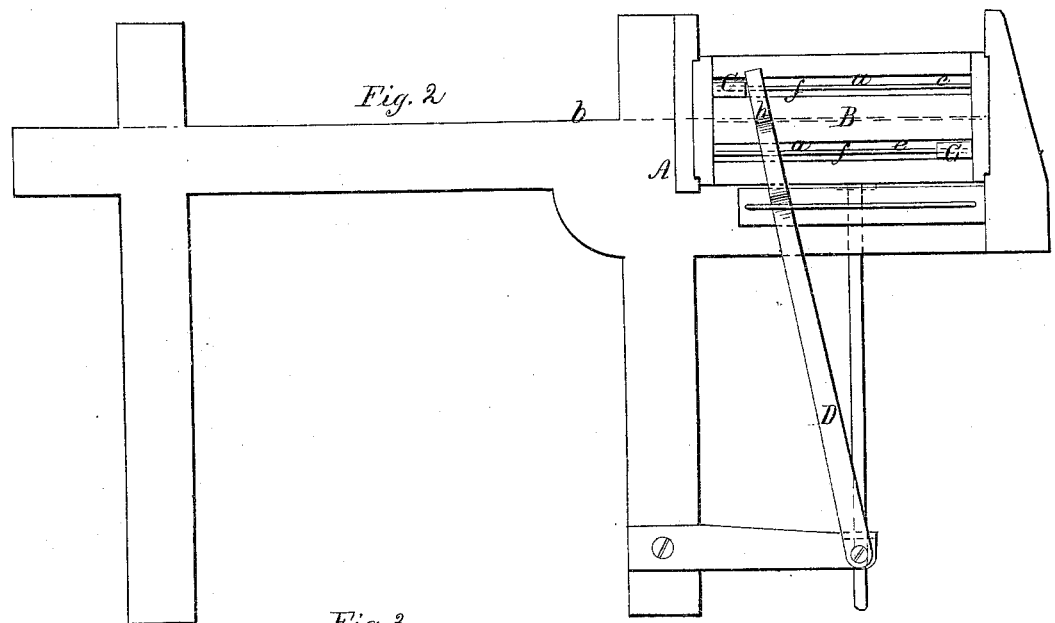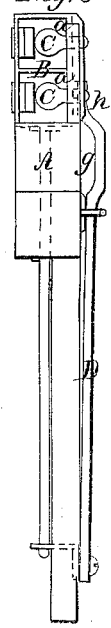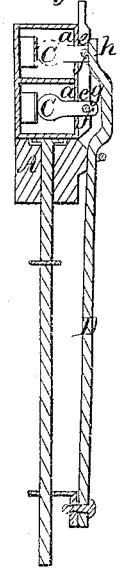

LUCIUS J. KNOWLES, OF WARREN, MASSACHUSETTS.

LOOM.

Specification of Letters Patent No. 16,015, dated November 4, 1856.

*To all whom it may concern:*

Be it known that I, LUCIUS J. KNOWLES, of Warren, in the county of Worcester and State of Massachusetts, have invented an Improvement in Looms for Weaving; and I do hereby declare that the same is fully described and represented in the following specification and the accompanying drawings, of which—

Figure 1, is a top view of a loom lay having my improvement. Fig. 2, is a front elevation of the same. Fig. 3, is an end elevation. Fig. 4, is a vertical and transverse section taken through the movable series of shuttle boxes and picker staff when the latter is arranged in a vertical position.

In these drawings, A, exhibits the lay of a loom, the same having applied to it a movable series (B) of shuttle boxes $a$, $a$, in such manner as to be capable of being raised in order that the bottom of each box may be moved successively into the same plane with the top of the race bar $b$, of the lay. To each shuttle I apply a picker C, to extend through a slot $e$, made through the side of the box, the said picker being supported by and so as to slide freely on a rod $f$, as shown in the drawings.

In connection with the two pickers I employ but one picker staff as shown at D, and I construct said staff immediately below the part which strikes the picker with a bend or recess as shown at $g$, and so that when the picker staff is in the act of throwing the upper of the two pickers, it may pass by the lower picker without touching or actuating the same. Furthermore, the said recess should be arranged so as not to prevent the picker staff from actuating the lowermost picker, when its shuttle box is raised upward so as to bring the bottom thereof even with the top of the race bar. In this way each picker may be operated in succession by one picker staff, the picker being moved by the upper part $h$, of the staff and the staff moved in the usual way.

In operating the shuttles of a movable series of shuttle boxes, it has been customary to employ only one picker to the several boxes of the series, the picker being moved from one box into the other or the boxes being moved so as to convey it from one into the other before the picker could be thrown through the latter by its staff. There are disadvantages attending such a mode of operating the shuttles, which are entirely obviated by my method as described which admits of the shuttles being worked much faster than they can be by the other mode as referred to.

I do not claim a single picker operating in connection with a movable series of shuttle boxes and so as to pass from one box into another of the series as occasion may require, but What I do claim is—

1. A combination of a single picker staff, pickers and boxes substantially as described wherein there is a separate picker for each box of the series, and all such pickers are successively moved toward and operated by such single picker staff during the operation of weaving with the shuttles of the said series of boxes.

2. I would remark that I by no means claim making a bar with a bend or recess as I am well aware that such without any reference to a special use of said bend or recess is no new invention, but what I do claim is the improvement in the picker staff, when applied to operate a series of pickers arranged in a set of shuttle boxes as described, the improvement consisting in the bend or recess G, applied to the picker staff so as to enable it while operating a picker to pass by another picker, under the former and not move the said other picker in its box, the whole being substantially as specified.

3. And I also claim making the picker staff with a bend or recess $g$, or its equivalent so as to enable it while operating a picker, to pass by another picker and not move the same in its box, the whole being substantially as specified.

In testimony whereof I have hereunto set my signature this fifteenth day of September A. D. 1856.

LUCIUS J. KNOWLES.

Witnesses:
 WM. M. WARD,
 JOS. F. HITCHCOCK.